(12) United States Patent
Pavan

(10) Patent No.: US 11,178,882 B2
(45) Date of Patent: Nov. 23, 2021

(54) SYSTEM AND METHOD FOR AUTOMATIC ORGANIZATION, HANGING AND DRIVING OF SLAUGHTERED ANIMALS

(71) Applicant: Valdair Pavan, Chapeco (BR)

(72) Inventor: Valdair Pavan, Chapeco (BR)

( * ) Notice: Subject to any disclaimer, the term of this patent is extended or adjusted under 35 U.S.C. 154(b) by 76 days.

(21) Appl. No.: 16/598,391

(22) Filed: Oct. 10, 2019

(65) Prior Publication Data

US 2021/0015112 A1 Jan. 21, 2021

(30) Foreign Application Priority Data

Jul. 16, 2019 (BR) .......................... 1020190146613

(51) Int. Cl.
*A22B 7/00* (2006.01)
*B65G 37/00* (2006.01)
*A22C 21/00* (2006.01)

(52) U.S. Cl.
CPC .............. *A22B 7/003* (2013.01); *A22B 7/002* (2013.01); *A22B 7/004* (2013.01); *A22B 7/005* (2013.01); *A22C 21/0053* (2013.01); *B65G 37/00* (2013.01)

(58) Field of Classification Search
CPC ......... A22B 7/002; A22B 7/003; A22B 7/005; A22C 21/0053; A22C 21/0046; B65G 37/00; B65G 7/004; B65G 47/1492; B65G 47/1457; B65G 21/18

USPC .................................. 452/177–180, 182–184
See application file for complete search history.

(56) References Cited

U.S. PATENT DOCUMENTS

| | | | | |
|---|---|---|---|---|
| 4,688,297 A * | 8/1987 | Bartels | ................ | A22C 21/003 452/135 |
| 5,279,518 A * | 1/1994 | Ekiss | ..................... | A22B 5/161 452/125 |
| 5,474,493 A * | 12/1995 | Tolbert | ............... | B65G 47/1457 198/392 |
| 6,588,243 B1 * | 7/2003 | Hyatt, Jr. | ............ | E05B 47/0002 70/278.1 |
| 7,467,994 B2 * | 12/2008 | Griffiths | ............... | A22B 5/0082 452/52 |
| 8,986,080 B2 * | 3/2015 | Black | ..................... | A22C 17/12 452/150 |

* cited by examiner

*Primary Examiner* — Richard T Price, Jr.
(74) *Attorney, Agent, or Firm* — Scott Houtteman; Houtteman Law LLC

(57) ABSTRACT

A system for automatic organization, hanging and driving of slaughtered animals installed at the outlet of a slaughtered animals processing station such as a chiller. The system comprises a receiving and aligning means of slaughtered animals in longitudinal position, which is previously disposed to an accumulator device of slaughtered animals positioned longitudinally. The system further comprises a suspension and movement assembly of each slaughtered animal from the axial alignment assembly to a driving guide of each slaughtered animal to a hanging transfer device of each animal slaughtered in the hanging line.

5 Claims, 5 Drawing Sheets

SYSTEM AND METHOD FOR AUTOMATIC ORGANIZATION, HANGING AND DRIVING OF SLAUGHTERED ANIMALS

This invention refers to a system for automatic organization, hanging and driving of slaughtered animals, particularly used for the automatic organization and movement of slaughter poultry, between a processing station of such already slaughtered birds for hanging thereof on a movement line of the slaughtered poultry. In addition, the invention also presents a method of automatic organization, hanging and driving of slaughtered animals.

BACKGROUND OF THE INVENTION

The constant population growth has resulted in even more preoccupations in relation to food production processes, so that companies of the field of food need to constantly search for evolution in their productivity to be able to lower their costs and increase the quality of their products. Otherwise, there is no way to be competitive in such a demanding market. Thus, technological advances are necessary so that production lines can achieve greater efficiency.

One of the greatest improvement needs is related to portioning or overhauling activities, as well as hanging poultry.

Thus, as it is a merely repetitive activity, in which nothing is added to the production, the processes involving portioning or overhauling become only functions of movement accumulations, causing RSI (repetitive strain injury) in the employees, resulting in leaves.

In addition, it creates unhealthy work due to the temperature of the product when it is changed, and considering that our legislation contributes a lot to the well-being of employees, in terms of daily cumulative load, this requirement is easily extrapolated in these points, being that an employee can easily make around 1.000 chicken/hour. Considering its average weight is around 3 kg, in 1 hour he would start with a cumulative load of 3.000 kg. In his normal work, in 4 hours would have already extrapolated his workload, thus requesting another employee in this function. This can be practiced, for example, on the hanging part of the poultry at the refrigerator reception, when it is still alive, as well as at the exit of the carcass cooling chiller.

The person skilled in the art knows devices and equipment used for performing hanging and driving poultry on meat production lines.

In general, such devices and equipment request intense human interference to perform their respective functions, being that often requesting high and repetitive physical efforts by human operators. Thus, disadvantageously, all steps of classification and handling of each poultry are performed by the operators, becoming the process costly and low productive, as well as impairing the physical integrity of operators.

In a proposal to solve the problems presented by the state of the art, applicant developed the technology taught by patent document BR102018003938-5, filed on Feb. 28, 2018, which presents a system for feeding and hanging slaughtered poultry automatically, by means of devices that perform the separation and handling of each slaughter poultry, so as to align it in a desired position, for easy hanging in standard positions.

Despite the advances achieved by this technology, which provided a more efficient accessible poultry alignment and hanging system, Applicant, continuing its studies in the area, noticed that there was further a need to improve such technology by becoming it more versatile and efficient in handling and driving poultry, to promote its alignment automatically without depending on human monitoring and intervention throughout the process, to correct any failures at different points.

For this purpose, instant invention has been developed, presenting a system and method for automatic organization, hanging and driving of slaughtered animals, which performs all the steps of separation, alignment and hanging of slaughtered animals fully automatic by means of prior choice of the desired final position for each slaughtered animal to be hung.

Advantageously, the system and method for automatic organization, hanging and driving of slaughtered animals of instant invention provides a more productive and less costly meat production process in which the need for human labor to perform with the poultry hanging is dismissed, as well as the conference and positioning corrections throughout the process.

The following schematic figures of a particular embodiment of the invention are presented, the dimensions and proportions of which are not necessarily actual, since the figures has only the purpose of didactically presenting their several aspects, the protection scope of which is determined solely by the scope of the enclosed Claims.

DESCRIPTION OF THE INVENTION

Figure 1:
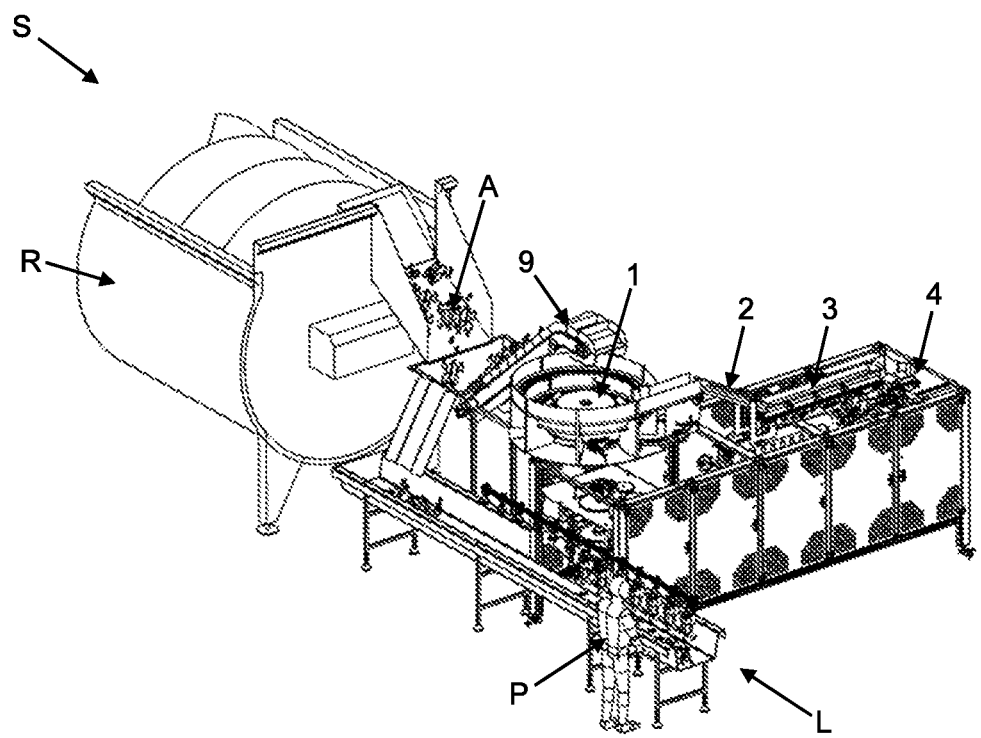
FIG. 1 illustrates a front perspective view of the system (S) for automatic organization, hanging and driving of slaughtered animals (A), showing an example of application together with a chiller (R)

As illustrated by the enclosed figures, the instant invention describes a system (S) for automatic organization, hanging and driving of slaughtered animals (A), such as slaughtered poultry, the system (S) being installed at the outlet of a processing station of slaughtered animals (A).

Said processing station may be configured by any equipment used to store and or process slaughtered animals (A), such as a chiller (R), from which such slaughtered animals (A) are directed by system (S) to a hanging line (L), in which slaughtered animals (L) proceed to other processing, storage and/or transport stations (not illustrated).

The system (S) comprises a receiving and alignment means (1) slaughtered animals (A) in longitudinal position, which receives the slaughtered animals (A) in a disorganized manner from the processing station, and organizes them so that they are all arranged in a longitudinal position, with their heads facing left or right and their chests up or down.

Said receiving and aligning means (1) is disposed prior to an accumulator device (2) of slaughtered animals (A) positioned longitudinally. This accumulator device (2) performs the queued accumulation of slaughtered animals (A) leaving the receiving and aligning means (1) in order to create a lung for the system (S) to operate continuously and more efficiently.

Even, the accumulator device (2) is followed by a set of tracks (3) for driving slaughtered animals (A) in a horizontal position to a transfer device (4) of slaughtered animals (A) to an upright position with the head facing down, wherein each slaughtered animal (A) is positioned in an axial alignment assembly (5) of each slaughtered animal (A).

Thus, the axial alignment assembly (5) is responsible for moving each slaughtered animal (A) so that they are all positioned with their chests forward, or so that they are all positioned with their chests behind, such choice being made by a simple and convenient programming of the axial alignment assembly (5) by a user party.

The system (S) further comprises a suspension and movement assembly (6) of each slaughtered animal (A) from the axial alignment assembly (5) to a driving guide (7) of each slaughtered animal (A) to a hanging transfer device (8) of each slaughtered animal (A) in the hanging line (L).

Optionally, an operator (P) may perform the conference of slaughtered animals (A) hung in the hanging line (L) to remove and/or separate any slaughtered animals (A) that have suffered damage to their carcasses.

The receiving and aligning means (1) comprises a circular track assembly (10) arranged around a central driving region (11) of slaughtered animals (A) towards the beginning of the circular track assembly (10). Thus, slaughtered animals (A) that are not positioned longitudinally will not follow along the circular tracks assembly (10), and will fall again in the central driving region (11) until they assume a longitudinal position, convenient for them to course the whole path defined by the circular track assembly (10).

Preferably for this purpose, the circular track assembly (10) is configured by one or more tracks arranged in upward spiral sequence around the central driving region (11), forming a ramp around thereof. Also, said central driving region (11) comprises a conical protrusion (110) which base is tangent to the beginning of the circular track assembly (10) to direct each slaughtered animal (A) that falls over this conical protrusion (110) to the circular track assembly (10).

Also, preferably, the accumulator device (2) is configured by an inclined sliding track of slaughtered animals (A), while the set of tracks (3) comprises a treadmill (30) followed by an accelerating track (31) from slaughtered animals.

Thus, the treadmill (30) slows down slaughtered animals that passes through the set of tracks (3), causing a queue to be created in the accumulator device (2) from which slaughtered animals (A) are slipped by gravity as the treadmill (30) moves slaughtered animals (A).

The transfer device (4) comprises at least one position recognition camera (not illustrated) of each slaughtered animal (A), and a rotatable and sliding two-way handling mechanism (40), from the position of each slaughtered animal (A) identified by each camera (not illustrated).

Thus, the handling mechanism (40) is capable of handling each slaughtered animal (A) to position it in the axial alignment assembly (5) with its head facing down, regardless of whether said slaughtered animal (A) is initially with the head facing left or right. To perform this positioning, the chest of each slaughtered animal (A) can be facing in any direction, since this alignment will be made by own the axial alignment assembly (5).

Preferably, the transfer device (4) comprises a driving duct (41) of each slaughtered animal (A) in the inlet direction of the handling mechanism (40), being the driving duct (41) disposed above the handling mechanism (40). Furthermore, the set of tracks (3) comprises a driving rail (32) of each slaughtered animal (A) in the inlet direction of the driving duct (41), the driving rail (32) being disposed after the accelerating track (31) and inclined towards the inlet direction of the driving duct (41).

Also preferably, the axial alignment assembly (5) comprises at least one position recognition camera (not illustrated) of each slaughtered animal (A), and a plurality of vertical positioning axial rotation adjustment vessels (50) of each slaughtered animal (A) from the position of each slaughtered animal (A) identified by each camera (not illustrated).

Thus, each camera (not illustrated) identifies which side the chest of each slaughtered animal (A) faces, and this information is used to properly move each adjustment vessel (50) that temporarily and individually houses each slaughtered animal (A) passing through the axial alignment assembly (5).

Furthermore, the axial alignment assembly (5) comprises a cyclic movement means (51) of the adjusting vessels (50), the cyclic movement means (51) being preferably configured by a track endowed with an downward sloping segment for that starts under the position of the driving guide (7). Thus, as slaughtered animals (A) are moved to the position of the driving guide (7), while being supported by the suspension and movement assembly (6), the adjusting vessels (50) are moved away from the slaughtered animals (A).

In a particular embodiment example of instant invention, each adjustment vessel (50) is preferably configured by a conical vessel rotated around its own axis by at least one piston (not illustrated), preferably endowed with a rack segment (not illustrated) that moves a toothed base (500) of the adjusting vessel (50).

The suspension and movement assembly (6) comprises a plurality of movable suspension supports (60) of hanging and handling each slaughtered animal (A) from the axial alignment assembly (5), each movable support (60) being preferably configured by a movable claw that holds each animal slaughtered (A) by its legs.

Preferably further, the suspension and movement assembly (6) comprises a cyclic movement means (61) of the movable supports (60), said cyclic movement means (61) being preferably configured by a track.

The driving guide (7) preferably comprises two lateral driving elements (70) of each slaughtered animal (A) guided from its inlet (71) by moving the suspension and movement assembly (6). Thus, the suspension and movement assembly (6) moves each slaughtered animal (A) to the position of the lateral driving elements (70) through said inlet (71).

Figure 2:
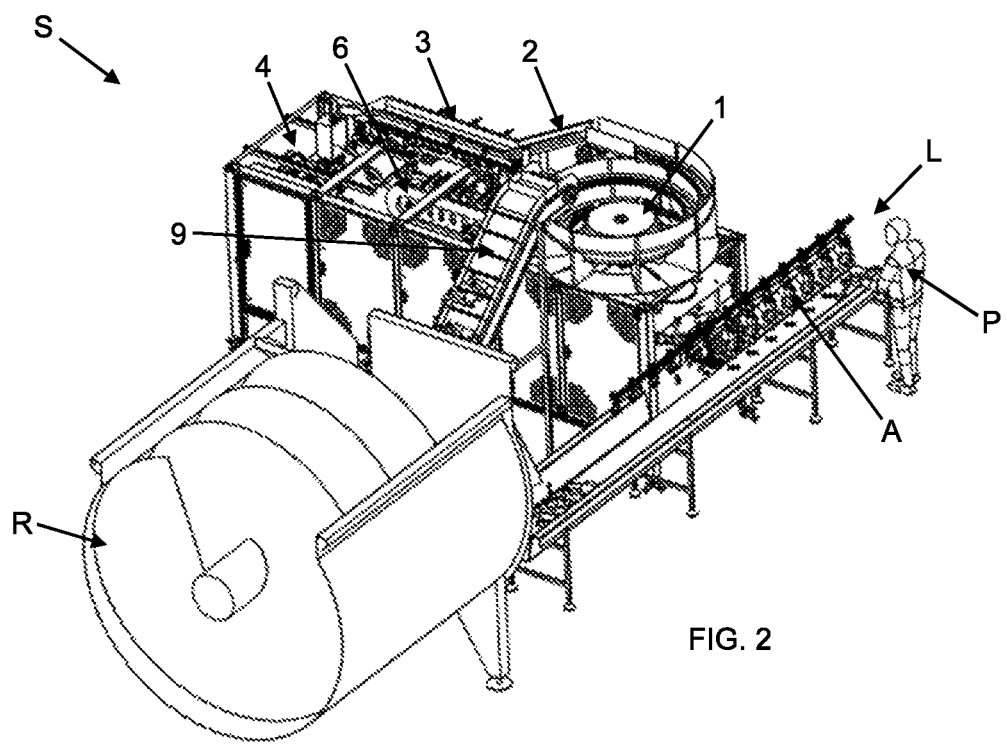
FIG. 2 illustrates a rear perspective view of the system (S) for automatic organization, hanging and driving of slaughtered animals (A), showing an example of application to a chiller (R)
Figure 3:
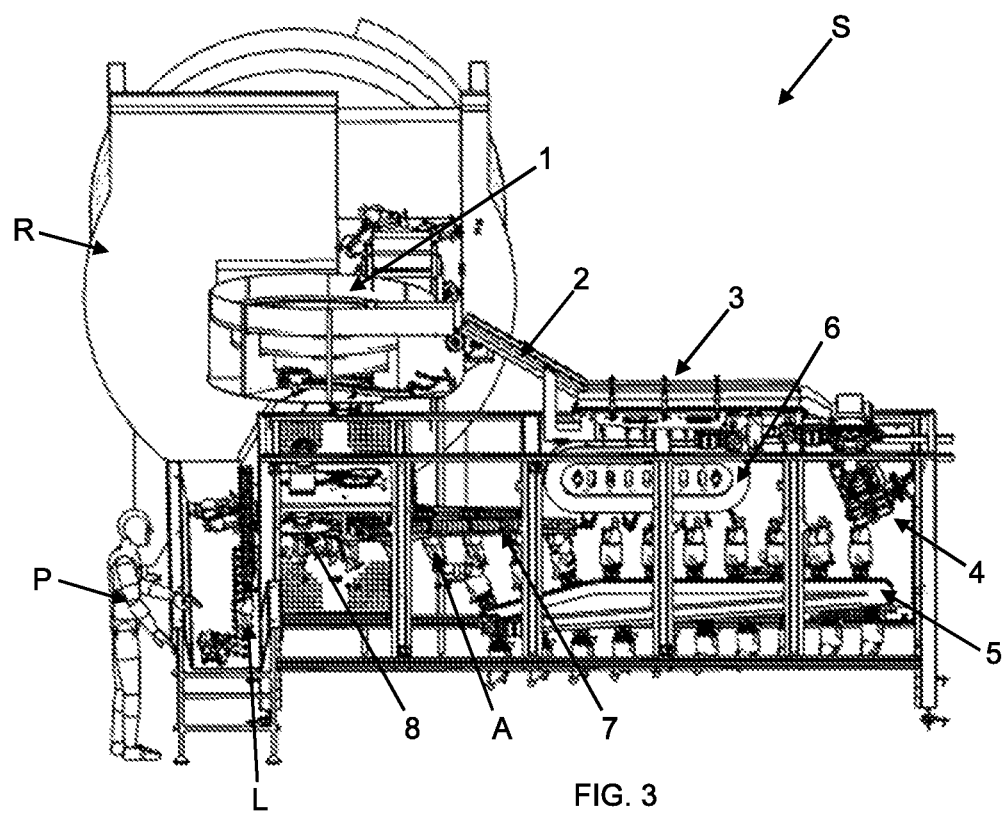
FIG. 3 illustrates a front perspective view of the system (S) for automatic organization, hanging and driving of slaughtered animals (A), showing the internal components of the system (S)
Figure 4:
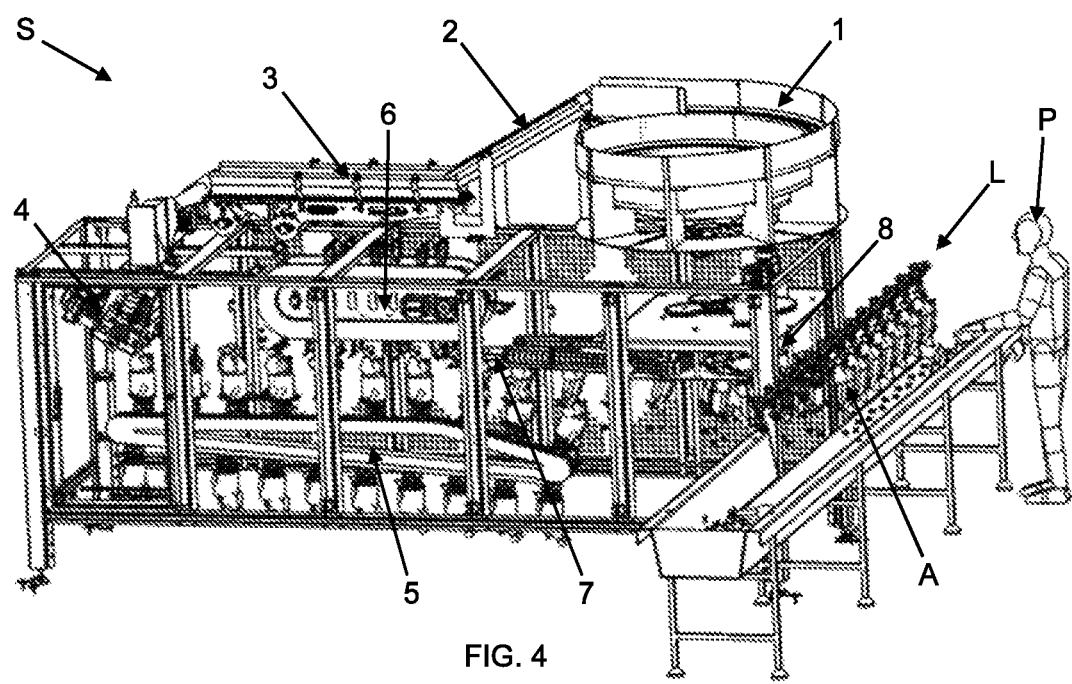
FIG. 4 illustrates a rear perspective view of the system (S) for automatic organization, hanging and driving of slaughtered animals (A), showing the internal components of the system (S)
Figure 5:
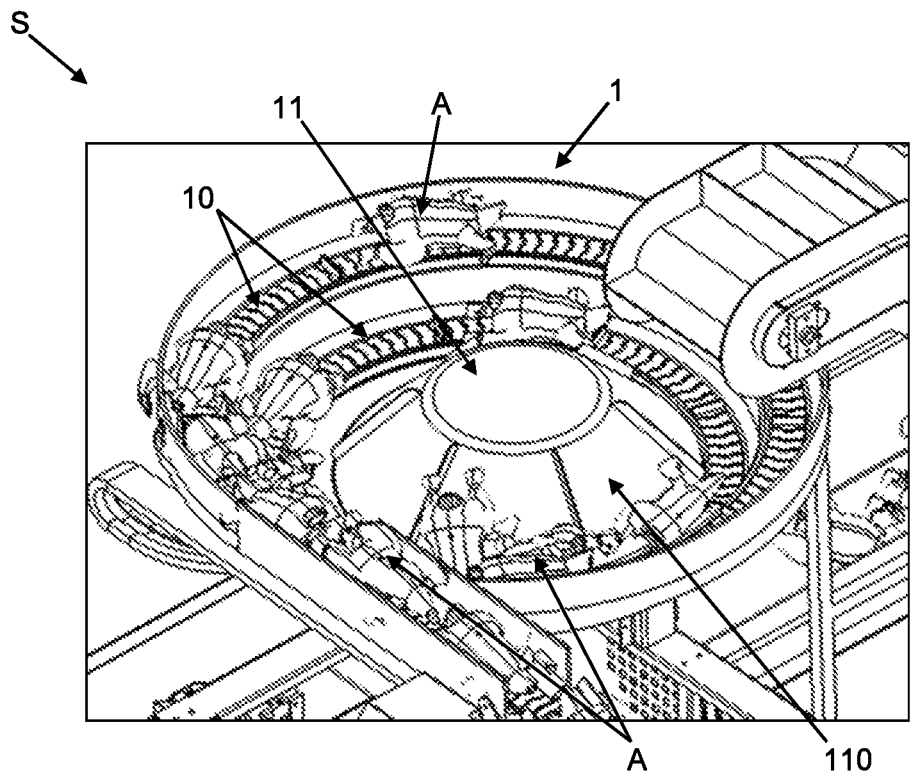
FIG. 5 illustrates an enlarged partial view of the system (S), showing the receiving and alignment means (1)
Figure 6:
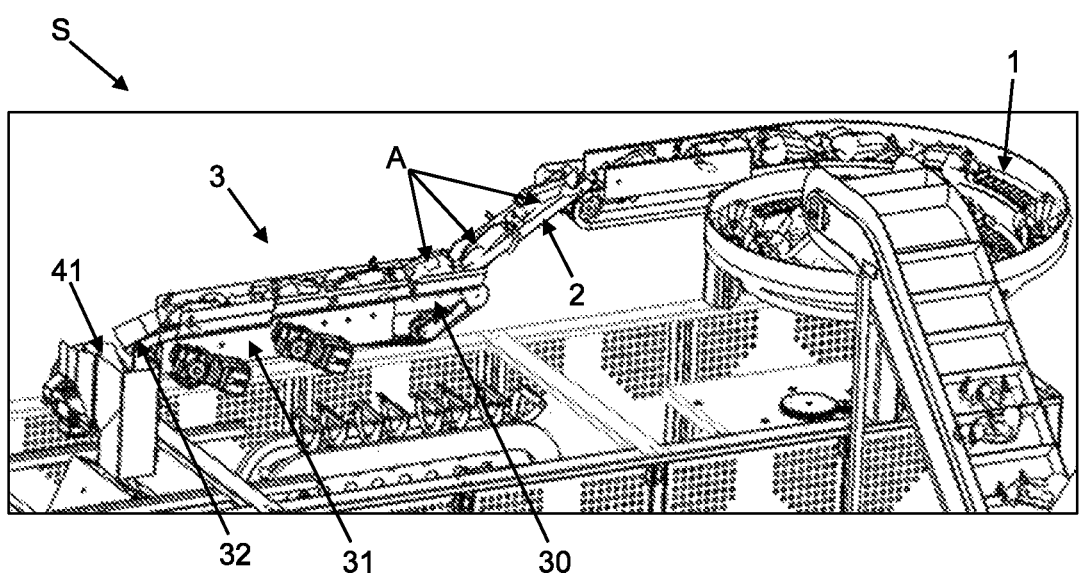
FIG. 6 shows an enlarged partial view of the system (S), showing longitudinal alignment and accumulation of slaughtered animals (A)
Figure 7:
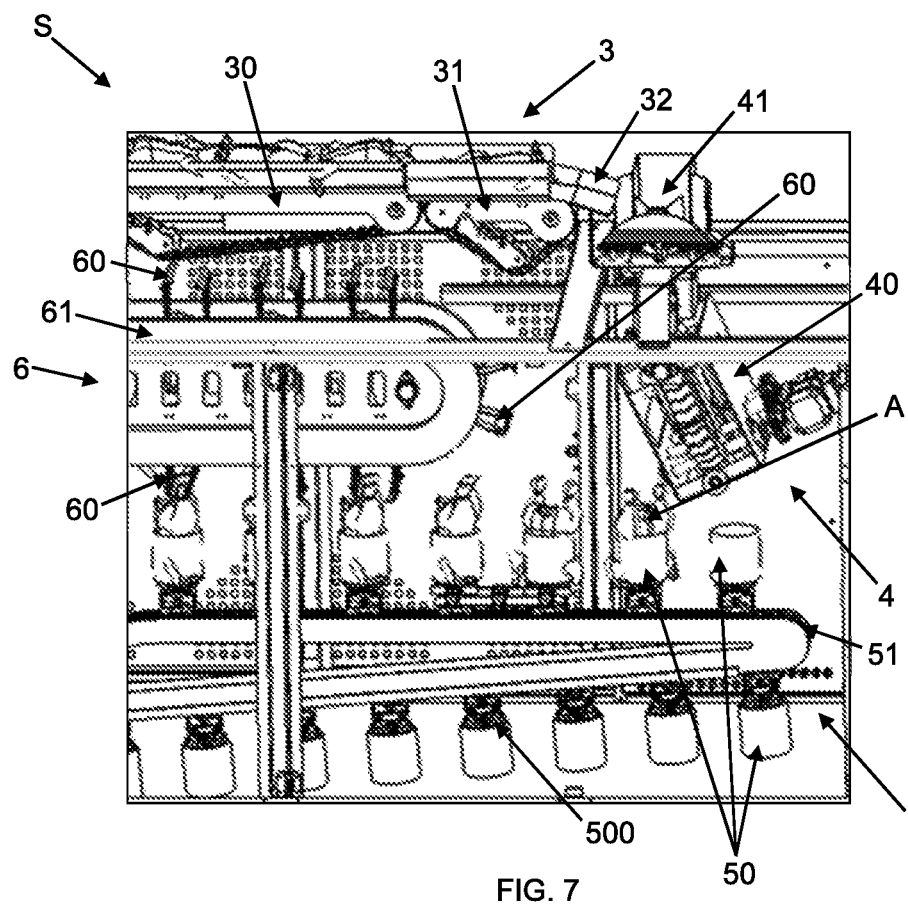
FIG. 7 shows an enlarged partial view of the system (S), showing the vertical positioning and axial alignment of slaughtered animals (A)
Figure 8:
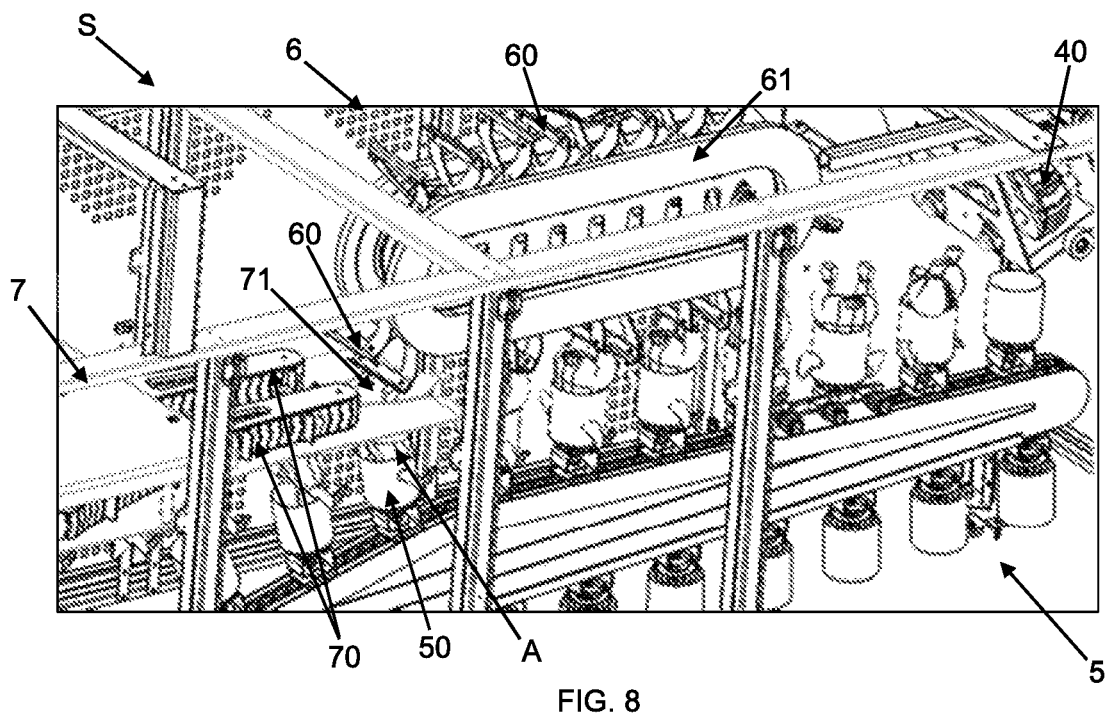
FIG. 8 shows an enlarged partial view of the system (S), showing the direction of slaughtered animals (A) already aligned to the driving guide (7)
Figure 9:
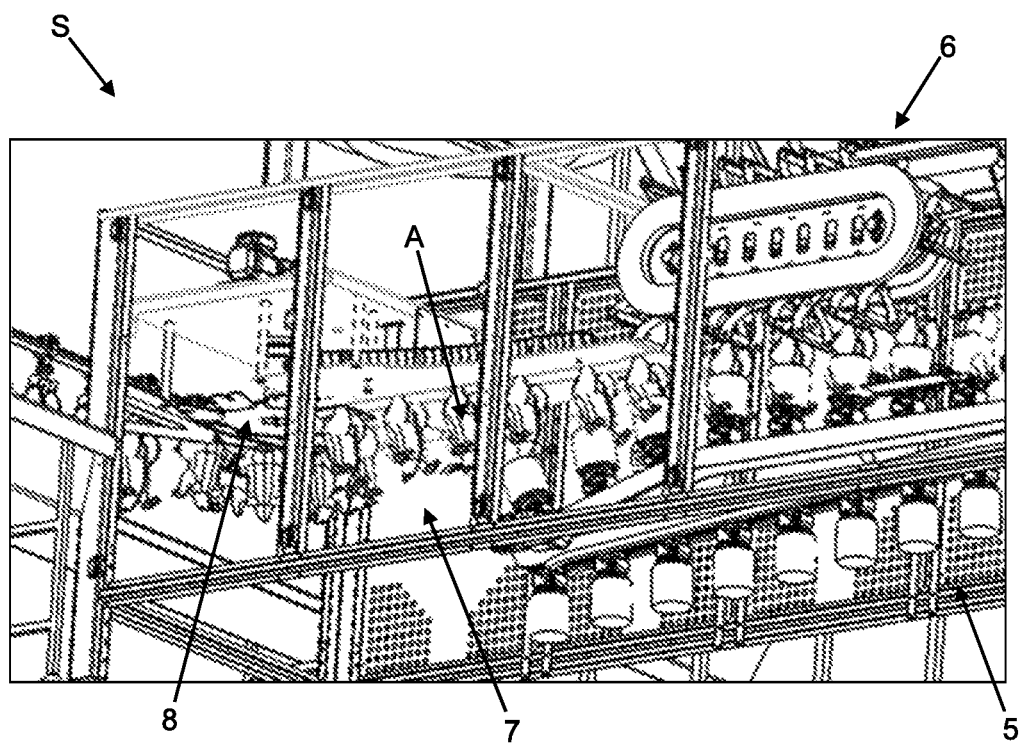
FIG. 9 shows an enlarged partial view in lower perspective of the system (S), showing the axial alignment of slaughtered animals (A) and their conduction to the driving guide (7) and, subsequently, to the hanging transfer device (8).

Finally, optionally, as illustrated by FIGS. 1 and 2, the system (S) may also comprise an inclined track (9), such as a giraffe track, driving each slaughtered animal (A) from the processing station of slaughtered animal (A), such as a chiller (R), to the receiving and aligning means (1), when the outlet of that processing station is positioned lower than the height of the receiving and alignment means (1).

The instant invention also presents a method for automatic organization, hanging and driving of slaughtered animals (A), such method being applied from the outlet of a processing station of slaughtered animals (A), such as a chiller (R) from which such slaughtered animals (A) are directed to a hanging line (L).

Thus, said method comprises the following sequence of steps:

a) receiving slaughtered animals (A) in a disorganized manner by the receiving and alignment means (1);

b) aligning each slaughtered animal (A) by the receiving and aligning means (1) to a longitudinal position with the head facing left or right and the chest facing down or up;

c) accumulating a quantity of slaughtered animals (A) queued in longitudinal position by an accumulator device (2) means;

d) driving slaughtered animals (A) through a set of tracks (3) for directing slaughtered animals (A) in a horizontal position to a transfer device (4) of slaughtered animals (A);

e) recognition the position of each slaughtered animal (A) and transition to a vertical position with the head facing downwards;

f) positioning each slaughtered animal (A) in an axial alignment assembly (5);

g) recognizing the position of each slaughtered animal (A) and rotating each slaughtered animal (A) to alignment thereof, with all chests facing forward or with all chests facing backwards;

h) moving each slaughtered animal (A) by means of a suspension and movement assembly (6) to a driving guide (7) of each slaughtered animal (A) to a hanging transfer device (8) of each animal slaughtered (A) on the hang line (L).

Preferably, during step "b", the alignment of each slaughtered animal (A) is performed by a circular track assembly (10) arranged around a central driving region (11) of slaughtered animals (A) to the beginning of the circular track assembly (10).

Thus, slaughtered animals (A) that are not positioned longitudinally will not follow along the circular track assembly (10), and will fall back into the central driving region (11) until they assume a longitudinal position, convenient for that travel the entire path defined by the circular track assembly (10) so as to repeat step "b" until this positioning condition is fulfilled.

During step "d", the driving of slaughtered animals (A) is preferable performed by a treadmill (30) followed by an accelerating track (31) of the slaughtered animals (A).

Furthermore, during step "e", the position recognition of each slaughtered animal (A) is preferably performed by means of at least one camera (not illustrated), and the position transition of each slaughtered animal (A) is preferably performed by a rotatable and sliding two-way handling mechanism (40) from the position of each slaughtered animal (A) identified by each camera (not illustrated).

During step "g", the position recognition of each slaughtered animal (A) is also preferably performed by at least one camera (not illustrated), and rotation of each slaughtered animal (A) is performed by a plurality of axially rotating adjustment vessels (50) of the vertical positioning of each slaughtered animal (A) from the position of each slaughtered animal (A) identified by each camera (not illustrated).

Finally, during step "h", the movement of each slaughtered animal (A) is preferably performed from a plurality of movable supports (60) of hanging and suspension of each slaughtered animal (A) from of the axial alignment assembly (5), each movable support (60) being configured by a movable claw that holds each animal slaughtered (A) by its legs.

The person skilled in the art will readily notice from the description various ways of performing the invention without departing from the scope of the enclosed claims.

The invention claimed is:

1. An apparatus for accepting an unoriented group of carcasses and automatically orienting them for transfer to a slaughter house hanging line comprising: a receiving-alignment assembly, an accumulator device, a transfer device, an axial alignment assembly and a suspension-movement assembly, the receiving-alignment assembly, designed to longitudinally orient the carcasses, further comprises a central driving region configured to contain animals which are in a disorganized orientation and a circular track located along the periphery of the central driving region, the central driving region further comprising a central conical protrusion with a surface that slopes radially outward and downward from the driving region center toward the circular track at the driving region periphery, said protrusion surface causing the carcasses located in the central driving region to move radially outward and into contact with the circular track such that carcasses longitudinally positioned (head facing left or right on the track) will enter the track and traverse the track's whole pathway, while carcasses not so positioned will fall back into the central driving region to repeat the process until the carcasses are longitudinally positioned and enter the track, the accumulator device, designed to accept carcasses from the circular track and to form them into a queue, further comprises a treadmill and an accelerating track, said treadmill being configured to accept carcasses from the circular track and deliver them to the accelerating track, the accelerating track being configured to allow the carcasses to queue up, and thus accumulate, before passing on to the transfer device, the transfer device, designed to transfer carcasses from the accumulator device the axial alignment assembly in two ways such that the carcass heads will be facing down in the axial alignment assembly regardless of the initial position of the carcass heads, said transfer device further comprises a position recognition camera and a two way handling mechanism configured such that:

when the camera detects a carcass with its head facing up the camera signals the handling mechanism to transfer the carcass one way, inverting the carcass, and when the camera detects a carcass with its head facing down the camera signals the handling mechanism to transfer the carcass the other way, without inverting the carcass, the axial alignment assembly, designed to accept the carcasses from the transfer device and to conditionally rotate the carcasses such that the carcasses are delivered to the suspension-movement assembly with the carcass chests facing the same direction regardless of the initial chest direction, said axial alignment assembly further comprising:

an axial rotation adjustment vessels and a chest orientation recognition camera configured such that,
when the chest orientation recognition camera detects a carcass chest facing opposite to a predetermined direction, the camera signals for rotation of the axial rotation adjustment vessel rotating the carcass into the predetermined direction, and
when the chest orientation recognition camera detects a carcass chest facing the predetermined direction the camera does not signal for rotation, the suspension-movement assembly is designed to receive the carcasses from the axial alignment assembly and preparing them for transfer to a slaughter house hanging line, said suspension and movement assembly further comprising a plurality of movable hanging supports, each hanging support further comprises a movable claw that engages a pair of carcass feet, lifts the carcass from the axial alignment assembly and moves the now suspended carcasses properly oriented in a manner suitable for transfer to the slaughter house hanging line.

2. The apparatus of claim 1 in which the carcass chest predetermined direction is facing forward.

3. The apparatus of claim 1 in which the carcass chest predetermined direction is facing backward.

4. The apparatus of claim 1 wherein the carcasses further comprise poultry carcasses.

5. The apparatus of claim 1, said circular track pathway further comprises an upward spiral.

* * * * *